United States Patent [19]

Hovsepian

[11] 3,877,983

[45] Apr. 15, 1975

[54] THIN FILM POLYMER-BONDED CATHODE

[75] Inventor: Boghos Karnig Hovsepian, Newark, N.J.

[73] Assignee: E. I. du Pont de Nemours & Company, Wilmington, Del.

[22] Filed: May 14, 1973

[21] Appl. No.: 360,939

[52] U.S. Cl. ............ 136/6 LN; 136/20; 136/100 R; 136/137
[51] Int. Cl. .......................................... H01m 43/00
[58] Field of Search........ 136/20, 83 R, 100 R, 137, 136/111, 120, 6 R, 6 LN, 154

[56] References Cited
UNITED STATES PATENTS

| | | | |
|---|---|---|---|
| 2,866,840 | 12/1958 | Dittmann et al. | 136/26 |
| 3,004,093 | 10/1961 | Richter et al. | 136/111 X |
| 3,271,195 | 9/1966 | Berchielli et al. | 136/67 |
| 3,413,154 | 11/1968 | Rao | 136/100 R |
| 3,421,944 | 1/1969 | Bauer | 136/83 RX |
| 3,455,742 | 7/1969 | Rao | 136/83 R |
| 3,579,384 | 5/1971 | Abens | 136/100 R |
| 3,726,716 | 4/1973 | Athearn et al. | 136/100 R |
| 3,778,310 | 12/1973 | Garth | 136/100 R |

OTHER PUBLICATIONS

"High Energy Batteries," Jasinsky, Plenum Press, N.Y., 1967, p. 156.

Primary Examiner—Anthony Skapars
Attorney, Agent, or Firm—James A. Costello

[57] ABSTRACT

Disclosed herein is an improved cathode for a high energy density cell, the improvement residing in the cathode having cathodically active material bonded to an imperforate conductive metal substrate by particular water-soluble organic polymers.

12 Claims, No Drawings

THIN FILM POLYMER-BONDED CATHODE

BACKGROUND OF THE INVENTION

1. Field of the Invention

This invention concerns a cathode for a high energy density galvanic cell said cathode containing a water-soluble organic polymer for binding cathodically active material to metal substrate current collector.

2. Description of the Prior Art

Cathodes for high energy density galvanic cells generally comprise cathodically active materials including, among other things, metal salts such as halides, oxides or sulfides which are reducible by the anodic active metals like lithium or sodium. The active cathode material is commonly associated with a metal of high electrical conductivity which is employed as a current collector and provides the cathodic contact between the cell and the outside circuit which consumes the energy provided by the cell. A similar contact is provided for the anode of the cell.

Various means have been proposed by the art for providing durable contact between cathodically active material and current collector. For one reason or another, many of such proposed means for providing contact are deficient. Binders heretofore suggested by the art for providing the desired contact are deficient because they do not meet all of the following criteria. The binder must be insoluble in nonaqueous electrolyte and not react with the other cell constituents, including the active metal anode and the electrolyte solute. Additionally, the binder material must be effective in small amounts and not significantly diminish the conductivity of the cathode as a whole. The cathodes disclosed herein, containing a binder that meets the criteria set out above, have good conductivity, long shelf life and are efficient in operation.

Expanded metal, which is widely used in cell manufacture, has the appearance of household window screen. It is not made of woven wire, however, but is made by punching holes in a metal sheet, then stretching or "expanding" the metal. This method of manufacture provides better conductivity than would a woven wire screen. When this product is used as a cathode (or anode) current collector, active material can be pressed into the openings to provide a unitary structure with the active material fairly well locked in to the metal substrate. While this construction provides electrodes having good electrical conductivity, a solid metal substrate provides even better conductivity.

SUMMARY OF THE INVENTION

In a high energy density cell comprising an active light metal anode, a cathode and a nonaqueous electrolyte, the improvment which comprises, the cathode having a thin conductive, imperforate metal substrate in contact with and bonded to particulate, cathodically active material with a water-soluble organic polymer selected from the group consisting of carboxymethylcellulose, hydroxyethylcellulose, soluble starch, polyvinyl alcohol, and protein-derived casein and gelatin, the polymer having no more than about 0.1 percent solubility in the electrolyte, based on the weight of electrolyte, the particulate material and the polymer comprising a substantially homogeneous conductive film.

Of the disclosed binders, carboxymethylcellulose, hydroxyethylcellulose and soluble starch are preferred with carboxymethylcellulose and hydroxyethylcellulose being most preferred.

Carboxymethylcellulose is generally available in the form of its alkali metal salt, sodium carboxymethylcellulose, and is used directly in this form. The term carboxymethylcellulose employed herein is meant to include the alkali metal salt thereof. The commercially available product is usually called carboxymethylcellulose or simply CMC. Other salt forms can also be employed such as the lithium or other alkali metal or alkaline earth metal salts provided they have the requisite properties discussed herein. The nature and properties of these polymers are described in "Water Soluble Resins" edited by Davison and Sittig, published by Reinhold Publishing Corp., New York, N.Y., 1962. By water-soluble is meant not only conventional solubility but also colloidal dispersions wherein solute aggregates are in the colloidal range.

Carboxymethylcellulose is prepared as shown in the following equation

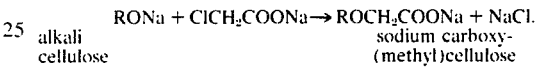

alkali cellulose     sodium carboxy-(methyl)cellulose

Hydroxyethylcellulose and other alkylcellulosics are produced by reacting cellulose with sodium hydroxide and the product with an alkylene oxide, as in the two reactions shown below.

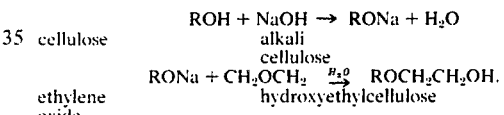

cellulose     alkali cellulose ethylene oxide     hydroxyethylcellulose

By "soluble starch" is meant modified starch, or converted starch such as can be used in chemical analyses. Such soluble starch includes starch that has been chemically treated to provide a lower dispersion viscosity in water than before treatment. The term specifically includes white and yellow dextrin and British Gum. The term encompasses modified and converted starches that have true solubility as well as those that form colloidal dispersions or thin, pseudo-solutions.

Dextrin is produced by heating starch in the presence of acid, usually hydrochloric acid. White dextrin production utilizes low temperature (<300°F.) and high acidity, while yellow dextrin is produced by heating starch at 300° to 375°F. with moderate acidity and low moisture (as compared to the conditions used in preparing white dextrin). To prepare British Gum, starch of very low moisture and little or no acidity is heated at about 300° to 375°F.

Polyvinyl alcohol is commercially available and the manner of its preparation is well-known and understood. Protein-derived casein and gelatin, likewise, are commercially available and preparable by well-known techniques from milk, etc. and animal tissue, bone, etc., respectively.

All of the contemplated water-soluble polymers disclosed herein behave in water so that a very small amount is widely distributed to intimately contact the particles of insoluble cathode material, causing them to cohere effectively. Solubility tests should be made before compatibility of the water-soluble polymer and the electrolyte can be assured, i.e., a solubility of less than about 0.1 percent by weight of the electrolyte.

A practical test can be performed easily by exposing a section of prepared cathode to the desired electrolyte in a sealed container at 20° to 30°C. for 72 hours. With unsatisfactory polymeric bonding agents, flaking of the active material from the metal substrate can be readily observed. Of course, many polymers can be eliminated from consideration merely by mixing them with the electrolyte and observing the dissolving or gelling tendency. Polyvinyl chloride, for instance, softens to a gel when in contact with the preferred electrolyte described below, and would be completely unsatisfactory as a bonding agent in the cathodes of the invention. Polymeric materials which exhibit inertness to the electrolyte can then be further tested by employing them in cathode preparation. The cathodes of this invention show no dissolving or flaking of active material after 6 months exposure.

The water-soluble polymers perform their cohesive-adhesive function when used in proportions of from about 0.1 to 15 percent of the weight of the cathode composition, which can contain conductivity aids in addition to the polymer and the cathodically active material. A preferred cathode utilizes 96 parts of active material, 2 parts of conductive carbon, and 2 parts of sodium carboxymethyl cellulose as the water-soluble polymeric binder.

DETAILS OF THE INVENTION

An especially important part of the structure of high energy density cells is the conformation and construction of the cathode. Examples of suitable cathodically active materials are sulfur, the oxides, sulfides and halides of copper, lead, silver, cadmium, zinc, iron, cobalt and nickel, and oxides of vanadium, titanium and tungsten. These materials are generally available or obtainable as free flowing powders, and for practical commercial cells must be cohesively arranged in some manner in contact with a current collector for contact with an external circuit.

The preferred cathodic materials are cupric sulfide and tungsten oxide, $WO_x$, where $x$ is about 2.0 to 2.9. The tungsten oxides exist in a number of forms, but the most clearly defined of those meeting the above formula are brown tungsten oxide, $WO_2$, and blue tungsten oxide where $x$ is about 2.7. The tungsten oxides are the subject of a coassigned patent application, filed concurrently herewith in the name of Karl Kamenski, entitled "Tungsten Oxide-Containing Cathode for Nonaqueous Galvanic Cell", bearing U.S. Ser. No. 360,937.

Preparation of cathodes of the invention involves application of active materials and binder in an aqueous system to a conductive substrate. The water is then removed before cell assembly. Removal of solvent water by application of heat is easy and efficient. Naturally, this is an important consideration in the commercial preparation of cathodes and cells, since quick and thorough removal of water promotes ease of assembly of the cell units.

This feature of ready solvent removal provides an advantage for the water-soluble polymers over many organic-soluble polymers which, due to their solvent requirements, may require higher temperature for complete removal of the organic solvent. It has also been found that even apparently complete removal of organic solvents can leave enough solvent in the polymer to disrupt the performance of cells constructed therewith. It has been found that the disclosed polymers can be strongly heated during cathode construction, even to the point of incipient charring, without injuring the performance of the cells employing them.

The necessity for use of conductivity aids such as graphite or other form of conductive carbon to prevent the polymer binder from insulating particles of active ingredients from one another is largely mitigated in the cathodes because of the small amount of binder used. Conductivity aids may of course be used if desired.

The excellent contact conferred by the use of polymer solutions to contact the active material, including any conductivity aid present, persists in the dry, completed cathode, and substantial homogeneity of active material, conductivity aid if present, and polymer is attained. The polymer provides both coherence among the active material particles and their adherence to the current collecting substrate without preventing good conductivity in the cathode. Cathodes prepared as disclosed herein can be flexed and even gently rubbed without cracking the active material coating or removing significant amounts of material from the substrate.

Conductive metal substrates that can be used include stainless steel, steel, aluminum, lead, copper and other conductive metals. Preferred metals are stainless steel and aluminum, which can be obtained and used in very thin yet strong sheets. Lead and copper give satisfactory performance but do not have the strength of the preferred materials. The thickness of the metal substrate is of the order of about 0.5 to 100 mils, preferably 1 to 5 mils. Thickness of the cathode as a whole may be from 0.5 to 120 mils, but is preferably from 2 to 10 mils. Total cell thickness can be from about 10 mils to about 375 mils (⅜ inch) thick.

In preparing cathodes a solution of about 0.1 to 5 percent polymer in water is normally employed depending on the properties of the particular polymer and enough active cathode material is added simultaneously or subsequently to form a homogeneous, workable slurry, or paste, or solution. Usually an amount of cathode material within about plus or minus 50 percent of the amount of water is employed. These proportions can vary widely depending on the thickness of cathode desired for the cell application in view. A conductivity aid such as finely divided conductive carbon can be added and mixed into the slurry or solution, in an amount up to the weight of the active ingredient but preferably from about 0.1 to 5 percent of that weight.

The suspension or solution containing the active material can be applied to the conductive substrate in any manner. It can be painted onto the substrate, applied by dipping, silk screening, rolled on, sprayed on or applied by printing techniques. If necessary, the thickness of the coating is adjusted by drawing excess off the surface with a straight edge. The composite can be dried by heating. Additional applications of the aqueous composition can be made to increase the thickness of the deposit. Ordinarily temperatures of about 100°C. to 180°C. are employed in drying the cathodes, but brief exposure to even higher temperatures up to 400°C. is permissible, since slight charring of the polymer may improve conductivity without significant loss in other desired properties. A vacuum oven can be employed also to assist drying.

Water should be essentially completely removed, that is, not more than 0.1 percent being detectable in the dried cathode, when determined by the Karl Fischer method. Such dryness can be obtained with the polymer bonded cathodes of the invention without difficulty, and is best illustrated by the durable performance of the cells. They have shown more than 6 months shelf life at 25°C., offering essentially the same performance under test from immediately after assembly to more than 6 months later. No evidence of undue gassing or other undesirable characteristic such as excessive polarization has been observed.

In an alternative method for preparing the polymer-bonded cathodes of the invention, a coating of the polymer solution is first applied to the metal substrate and powdered cathodically active material applied to the wet or partially dried polymeric binder. The composite is then dried by heating as already described. The dried cathode sheet can be passed through pressurized rollers to further densify the polymer-cathodically active material and substrate.

In all of these methods of cathode preparation it will be understood that the amount of particulate matter, including any conductivity aid, and the conditions applied should suffice to ensure contact among the particles themselves and also of the particles to the current collector substrate, thus providing a conductive cathode.

The cathodes can be prepared in a variety of forms and shapes depending on the type of cell in which they are to be used. They can be prepared for use in coiled cells, in button cells, and in flat cells. The types of galvanic cells in which the polymer bonded cathodes of the invention are most useful are those providing a high current drain for a relatively short period of time followed by a rest or regain period before current is again withdrawn. In this kind of application a premium is placed on conductivity of the electrodes since a very large proportion of the active material must be available for energy production when subjected to current drain. Thin, high surface electrodes of this invention are well suited for this use, whether in flat cells, coiled cells or otherwise. The cells comprise an anode, a cathode, a nonconductive separator therebetween and a conductive electrolyte in mutual contact with anode and cathode. A current conductor is provided for both anode and cathode with provision for connection to an outside circuit for use of the energy available.

The Rest of the Cell Components

Any highly conductive anode material can be employed herein. The preferred anode material is lithium, which is highly conductive and is at the same time sufficiently cohesive to permit its use in plates, ribbons, chips, etc., without excessive difficulty in fabrication and use. In addition, lithium can be easily bonded to metal substrates such as steel or aluminum.

Cells of the invention can utilize nonaqueous electrolytes having conductivity of at least $1 \times 10^{-4}$ ohm$^{-1}$ cm$^{-1}$. Among the useful nonaqueous solvents are tetrahydrofuran, dimethyl carbonate, propylene carbonate, 1,3-dioxolane, 4-methyl-1,3-dioxolane, 1,2-dimethoxyethane, dimethylformamide, trimethyl carbamate, ethyl-N,N-dimethyl carbamate, the dimethyl ether of diethylene glycol, and various mixtures of these. Useful solutes include perchlorates, hexafluorophosphates, tetrafluoroborates, tetrachloroaluminates and hexafluoroarsenates of lithium, sodium, potassium, aluminum, magnesium, calcium and beryllium.

A preferred electrolyte solvent is dioxolane or substituted dioxolane, having the formula (I) 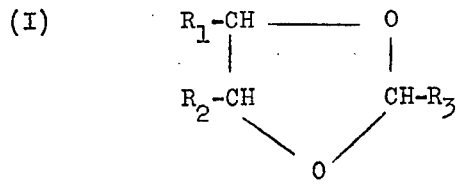

wherein $R_1$, $R_2$ and $R_3$ are the same or different and are hydrogen or alkyl of one to three carbon atoms, the total number of carbon atoms in $R_1$, $R_2$ and $R_3$ not exceeding six. More preferred electrolyte solvents are those of formula (I) in which $R_1$ and $R_3$ are hydrogen and $R_2$ is hydrogen or methyl. The most preferred solvent because of its highest performance is dioxolane, i.e., the compound of formula (I) in which $R_1$, $R_2$ and $R_3$ are hydrogen.

The electrolyte salt is present in sufficient concentration to provide a conductivity at 25°C. of at least $1 \times 10^{-4}$ ohm$^{-1}$ cm$^{-1}$ and can be present in amounts ranging up to the saturation value. Usually it is preferred to avoid a saturated solution because upon cooling the battery, sufficient salt may precipitate to interfere with battery function. Therefore, preferred electrolytes ordinarily consist essentially of from about 5 to about 30 percent by weight of salt and from about 95 to about 70 percent by weight of solvent. A highly preferred combination consists essentially of about 10 percent by weight of LiClO$_4$ and about 90 percent by weight of dioxolane. The LiClO$_4$-dioxolane system is not only highly conductive but also essentially nonreactive with lithium metal.

It is sometimes advantageous to utilize in addition to a dioxolane as the primary solvent, a secondary solvent such as an aliphatic or cycloaliphatic carbohydric ether having a molecular weight no greater than about 165. Representative of such secondary solvents are cycloaliphatic carbohydric ethers other than dioxolane composed of carbon, hydrogen and oxygen and having 3–6 members including one oxygen atom or 2 non-adjacent oxygen atoms in the ring such as ethylene oxide, propylene oxide, butylene oxide, dioxane, tetrahydropyran, dihydrofurane, and tetrahydrofurane. Other such secondary solvents are aliphatic ethers characterized by the formula RO$-(\text{CH}_2\text{CH}_2\text{O})_n-$R where $n$ is 0, 1 or 2, preferably where R is methyl or ethyl and $n$ is 1 or 2. Representatives of such aliphatic ethers are diethyl ether, 1,2-dimethoxyethane, 1,2-diethoxyethane, the dimethyl ether of diethylene glycol and the diethyl ether of diethylene glycol. Preferred are the 1,2-dimethoxyethane and the dimethyl ether of diethylene glycol.

The secondary solvent reduces the amount of gas formed during discharge. The amount of such secondary solvent can range up to about a 1:1 weight ratio with the dioxolane. The concentration ranges for the salt in such binary solvent are the same as those for a dioxolane alone, with about 10 percent by weight LiClO$_4$ and about 90 percent by weight of 1:1 binary solvent most preferred. Small amounts (up to about 25 percent by weight) of other solvents can also be used in the solvent mixture to promote the properties described above. Such solvents include methyl acetate, propylene carbonate, dimethyl carbonate and others.

A tertiary nitrogen base such as dimethylisoxazole, pyridine or triethylamine can also be added to the electrolyte solvent in small amounts, normally up to but not including 10 percent by weight, and preferably from about 0.1 percent by weight to about 1 percent by weight to suppress the tendency of the electrolyte system to form polymer.

A large number of electrolyte salts are useful in the electrolytes. Such salts must have sufficient solubility and dissociation to provide conductivity of at least about $1 \times 10^{-4}$ ohm$^{-1}$ cm$^{-1}$ in the electrolyte solution. Generally, the more useful salts are those with cations chosen from groups IA and IIA of the Periodic Table. The most useful salts are those wherein lithium, sodium, potassium or tetraalkylammonium are the cations. In addition to simple halogen salts many complex salts are useful, including tetrafluoroborates, hexafluorophosphates, hexafluoroarsentates, tetrachloroaluminates, and perchlorates. Also useful are salts of trichloroacetic acid, trifluoroacetic acid and trifluoromethanesulfonic acid. As indicated above, the most preferred salt is $LiClO_4$.

DESCRIPTION OF THE PREFERRED EMBODIMENTS

The following Examples are meant to illustrate but not to limit this invention.

Cell Construction

Fabrication of cells containing the cathodes described herein, having active material bonded to current collector, are fabricable in any manner contemplated by those skilled in the art. This invention is not particularly concerned with the shape of the cell or the shape of the cathode but is concerned primarily with cathodes (and cells containing them) which incorporate the particular binders described herein. It will be exceedingly obvious how to practice this invention.

For completeness, a brief description is given for making one type of cell, a round button cell: Circular metal cups, say, about 1.15 inches in diameter with sides upstanding about, say, 0.25 inch are stamped from, say, 0.025 inch sheet steel. Inside the cup, and fitted closely, is placed a plastic insulator ring, a lithium disc, a nonconductive separator and a disc-shaped cathode having cathodically active material, including a polymeric binder of this invention, in the form of a thin film of preferred thickness between 1 to 20 mils, bound to a flexible sheet of metal substrate (about, say, 1 to 10 mils thick). The electrolyte is added and a top is placed on the edge of the insulator ring. The upstanding sides are bent over and down on the insulator ring, holding and pressing against the top and forcing the metal top against the cathode inside the cell.

The pulse discharge test employed in these Examples is designed to show the suitability of the cells tested for use in applications demanding high current drain for short periods followed by a recovery period. An example of an application of this kind is use of a cell or battery in a camera for energizing film advance, automatic lens adjustment and the like. The test is performed by discharging the cell or battery of 6.8 sq. cm. electrode area for 1.1 seconds under a 9.5 ohm resistance load, then allowing 3 seconds for recovery. The cycle is repeated eleven times, noting the change in voltage afforded as the test progresses. The tests demonstrated that the cells maintain very good voltage for 11 cycles under the conditions described.

Long shelf life of cathodes and cells employing the binder(s) described herein was demonstrated by testing certain cells that had been stored for more than 6 months at 25°C. Their performance was most satisfactory as evidenced by their furnishing more than 2.0 volts after 11 discharges.

EXAMPLE 1

A solution was prepared of 0.5 gram of sodium carboxymethylcellulose in 10 ml. of deionized water, and 0.5 gram of finely divided conductive carbon was added and mixed to give a homogeneous suspension or paste. To the suspension was added 10.0 grams of commercially available blue tungsten oxide, $WO_{2.7}$. The tungsten oxide had first been screened through a 325 mesh sieve. The resulting homogeneous suspension was coated onto a 1.5 mil thick steel plate about 2.5 inches by 3 inches using a Gardner knife to attain a smooth surface. The coated plate was dried at 80°C. for about 30 minutes, then further dried in a vacuum oven at 140°C. for 3 hours. The dry coated plate was then passed through steel rolls to further smooth the surface.

The resistance of the coated plate which had an overall thickness of 4.5 mils was $70 \times 10^{-3}$ ohms. Cathode pieces were cut from the coated plate and assembled into button type galvanic cells employing lithium anodes, paper separators and an electrolyte composed of 16.5 percent lithium perchlorate, 68 percent 1,3-dioxolane, 15 percent ethylene glycol dimethyl ether and 0.5 percent 4,5-dimethylisoxazole. When preparing the cathode, the sodium carboxymethylcellulose-carbon-tungsten oxide slurry was very uniform and covered the plate on which it was painted smoothly. Sodium carboxymethylcellulose was insoluble in the electrolyte, and the cathode exhibited excellent adherence to the substrate when tested by flexing the cathode.

Five of the prepared cells employing sodium carboxymethylcellulose were tested by discharging them in pulses under a 9.5 ohm load (1.1 seconds on, 3.0 seconds off). The data are shown in Table 1.

TABLE 1

| Cell | Test Temperature | Cell Discharge Test, Volts | |
|---|---|---|---|
| | | 1st Pulse | 11th Pulse |
| 1 | 25°C. | 2.41 | 2.30 |
| 2 | 25°C. | 2.39 | 2.30 |
| 3 | 25°C. | 2.40 | 2.30 |
| 4 | 25°C. | 2.31 | 2.18 |
| 5 | 0°C. | 2.27 | 2.13 |

Comparative Evaluation

In contrast to the good performance of carboxymethylcellulose-bound cathodes, cathodes employing polyvinylmethylether or polyethylene glycols of 1,500 or 5,000 molecular weight were unsatisfactory in the disclosed preferred electrolyte. Cathodes prepared in the same manner as above but using these polymers as binders flaked badly when exposed for several hours to the electrolyte solution.

EXAMPLE 2

A solution was prepared of 0.4 gram of sodium carboxymethylcellulose in 10 ml. of water, and to it were added 0.5 gram of finely divided conductive carbon and 10.0 grams of blue tungstic oxide, $WO_{2.7}$. The well-mixed uniform suspension was poured onto a 1.5 mil thick flat steel plate 2.5 by 3 inches, and a Gardner knife drawn over it to attain a smooth coating. The coated plate was dried in an oven at 60°C. for several hours. Resistance of the dried cathode was $80 \times 10^{-3}$ ohms. The cathode was then placed in a muffle furnace at 400°C. under a blanket of argon gas for about 2 minutes. The resistance of the cathode after heating at 400°C. was $38 \times 10^{-3}$ ohms. The cathode coating did not crack or crumble when the plate was repeatedly flexed.

A portion of the plate was used in a galvanic button cell with a lithium anode, a paper separator and an electrolyte of the same composition as in Example 1. When tested by pulse discharge as in Example 1 the data of Table 2 were obtained.

TABLE 2

| Discharge Temperature | 1st Pulse | 11th Pulse |
|---|---|---|
| 25°C. | 2.25 volts | 2.12 volts |
| 0°C. | 2.15 volts | 2.00 volts |

This Example illustrates the tolerance of the cathode composition to high temperature drying conditions. Such conditions save assembly time and assist efficient commercial cell production.

EXAMPLE 3

A solution was prepared of 0.6 gram of sodium carboxymethylcellulose in 20 ml. of water, and to it were added 29.4 grams of blue tungstic oxide, $WO_{2.7}$. The well-mixed slurry was coated onto a 1.5 mil thick steel plate 2.5 by 3.1 inches and dried, first in air at 50°C. then in a vacuum oven at 120°C. The resulting coated and dried cathode plate was 9 mils thick. It was assembled into a flat galvanic cell with a lithium anode, a nonconductive separator and an electrolyte containing 20 percent lithium perchlorate, 57.4 percent 1,3-dioxolane, 22.2 percent ethylene glycol dimethyl ether and 0.4 percent 3,5-dimethylisoxazole. The cell was tested by pulse discharge at 0°C. under a 1.6 ohm load (1.1 seconds on, 3.0 seconds off) for 11 pulses. The first pulse gave 2.05 volts and the 11th pulse gave 2.12 volts.

These data indicate that satisfactory cells of the invention can be prepared without the addition of conductive carbon or other aids to conductivity. Adherence of the active film to the metal substrate was quite satisfactory.

EXAMPLES 4-8

Cathodes were prepared as described in Example 2 with tungsten oxide ($WO_{2.7}$) as cathode material, employing five different water soluble polymers in place of the sodium carboxymethylcellulose used in that Example. The cathodes were dried at 60°C. for several hours, then in a vacuum oven at 140°C. for 3 hours. They were assembled into flat galvanic cells employing lithium anodes, nonconductive ceramic separators and the electrolyte composition of Example 1. The completed cells were tested in pulse discharge under a 1.6 ohm load at room temperature (1.1 seconds on, 3.0 seconds off). The data of Table 3 were obtained.

TABLE 3

| | | Cell Voltage | |
|---|---|---|---|
| Example | Cathode Polymer | 1st Pulse | 11th Pulse |
| 4 | Dextrin | 2.20 | 2.12 |
| 5 | British Gum | 2.25 | 2.25 |
| 6 | Converted Starch | 2.20 | 2.15 |
| 7 | Polyvinyl alcohol | 2.25 | 2.30 |
| 8 | Hydroxyethyl-cellulose | 2.37 | 2.22 |

The cathodes for all these cells showed good adhesion of the cathode material to the stainless steel substrate and good cohesion as indicated by resistance to removal by rubbing. Their good functional performance (maintenance of electromotive force) indicated that the other requirements of polymer inertness, stability and non-interference with conductivity were satisfactorily met.

EXAMPLES 9 and 10

Following the procedure of Example 3 flat cells were assembled employing in one case copper sulfide, CuS, and in the other case vanadium pentoxide, $V_2O_5$, in place of the blue tungstic oxide of Example 3.

The cell containing the copper sulfide cathode was stored at 52°C. for 14 days, then pulsed at 0°C. under a 1.1 ohm load (1.1 seconds on, 3.0 seconds off), and similarly at 25°C. Results are shown in Table 4 below.

TABLE 4

| Temperature of Discharge | 1st Pulse | 11th Pulse |
|---|---|---|
| 0°C. | 1.45 | 1.40 |
| 25°C. | 1.63 | 1.67 |

The cell containing the vanadium pentoxide cathode was similarly pulsed under a 1.6 ohm load when freshly assembled, after three days at room temperature, and after storing at 52°C. for 14 days. The data obtained are shown in Table 5 below.

TABLE 5

| Temperature of Discharge | Discharge Voltage | | Cell History |
| | 1st Pulse | 11th Pulse | |
|---|---|---|---|
| 25°C. | 2.85 | 2.57 | fresh |
| 0°C. | 2.15 | 2.00 | 3 days old |
| 0°C. | 1.95 | 2.05 | 14 days at 52°C. |

The embodiments of the invention in which an exclusive property or privilege is claimed are defined as follows:

1. In a high energy density cell comprising an active light metal anode, a cathode and a nonaqueous electrolyte, wherein the improvement consists essentially of, the cathode having a thin conductive, imperforate metal substrate in contact with and bonded to particulate, cathodically active material and optionally, conductivity aid, said bonding being with a water-soluble organic polymer in the amount of from 0.1 to 15 percent by weight of the cathodically active material, conductivity aid and polymer, said polymer selected from the group consisting of carboxymethylcellulose, hydroxyethylcellulose, soluble starch, polyvinyl alcohol, and protein-derived casein and gelatin, said cathodically active material being selected from at least one member of the group consisting of sulfur, the oxides, sulfides and halides of copper, lead, silver, cadmium, zinc, iron, cobalt and nickel, and the oxides of vanadium, tatanium and tungsten, the polymer having no more than about 0.1 percent solubility in the electrolyte, based on the weight of electrolyte, the particulate material and the polymer comprising a substantially homogeneous conductive film.

2. A cell according to claim 1 wherein the organic polymer is selected from carboxymethylcellulose, hydroxyethylcellulose, and soluble starch.

3. A cell according to claim 2 wherein the organic polymer is selected from carboxymethylcellulose and hydroxyethylcellulose.

4. A cell according to claim 3 wherein the organic polymer is carboxymethylcellulose.

5. A cell according to claim 4 wherein the carboxymethylcellulose is sodium carboxymethylcellulose.

6. A cell according to claim 3 wherein the organic polymer is hydroxyethylcellulose.

7. A cell according to claim 1 wherein the conductive metal substrate is a flexible sheet from about 1 to 10 mils thick and the cathodically active material is in the form of a film from about 1 to 20 mils thick.

8. A cell according to claim 7 wherein the conductive metal substrate is selected from stainless steel and aluminum.

9. A cell according to claim 2 wherein the conductive metal substrate is a flexible sheet from about 1 to 10 mils thick and the cathodically active material is in the form of a film from about 1 to 20 mils thick.

10. A cell according to claim 9 wherein the conductive metal substrate is selected from stainless steel and aluminum.

11. A cell according to claim 3 wherein the conductive metal substrate is a flexible sheet from about 1 to 10 mils thick and the cathodically active material is in the form of a film from about 1 to 20 mils thick.

12. A cell according to claim 11 wherein the conductive metal substrate is selected from stainless steel and aluminum.

* * * * *